A. WATKINS.
PROCESS FOR PREDETERMINING THE TIME NECESSARY FOR THE FERMENTATION OR RISING OF DOUGH FOR BREAD AND THE LIKE.
APPLICATION FILED AUG. 24, 1915.
1,254,457.
Patented Jan. 22, 1918.
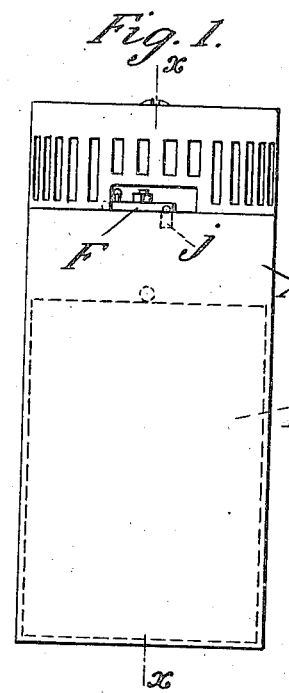
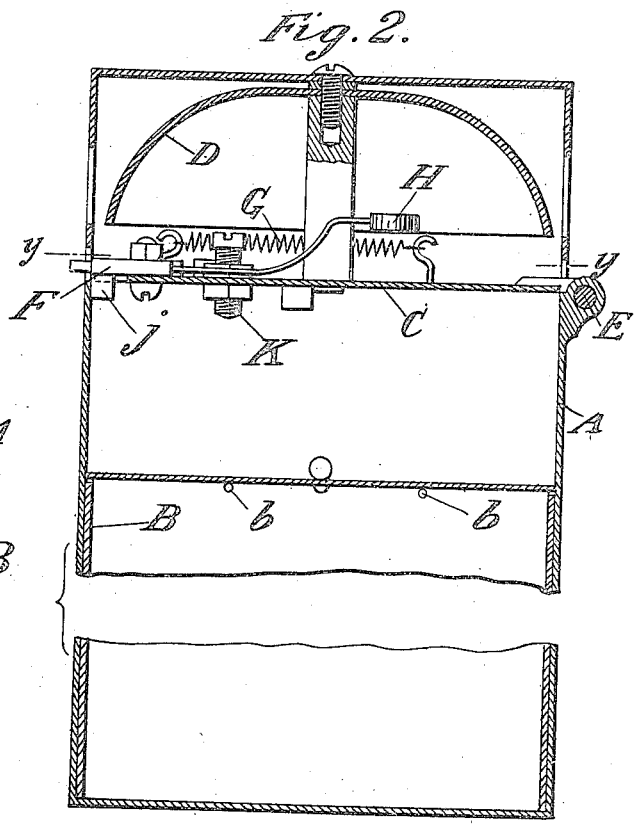
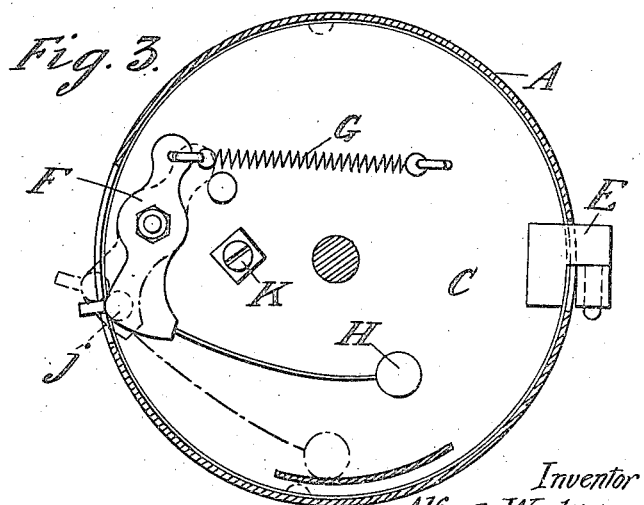
Witnesses
Inventor
Alfred Watkins,
by James L. Norris
Attorney.

UNITED STATES PATENT OFFICE.

ALFRED WATKINS, OF HEREFORD, ENGLAND.

PROCESS FOR PREDETERMINING THE TIME NECESSARY FOR THE FERMENTATION OR RISING OF DOUGH FOR BREAD AND THE LIKE.

1,254,457. 
Specification of Letters Patent. 
Patented Jan. 22, 1918.

Application filed August 24, 1915. Serial No. 47,199.

*To all whom it may concern:*

Be it known that I, ALFRED WATKINS, a subject of the King of Great Britain, residing in Hereford, England, have invented a certain new and useful Process for Predetermining the Time Necessary for the Fermentation or Rising of Dough for Bread and the like, of which the following is a specification.

It is well known that yeast used by bakers, confectioners and others for mixing with dough for bread, pastry and the like to produce the fermentation or rising necessary in the dough before it is in a condition for the oven, varies very largely in quality and in the time it takes to produce the desired effect on the dough. A baker also often desires to make two or more mixings one which will rise comparatively quickly and the other or others comparatively slowly and for this purpose he uses varying quantities of yeast. Up to the present, however, he has never been able to ascertain early in the process of rising what length of time will be required to complete the process so that he may be enabled to make his arrangements beforehand accordingly.

The present invention consists in a process whereby early in the process of rising, the baker or other person can determine the length of time that will be required for its completion.

I have found as a result of experiment with many qualities of yeast and with mixtures of varying proportions that when the relations of time and volumetric expansion of the dough are plotted in curves, the curves for every quality and mixture bear a definite relation to each other, so that if the time required for a definite volumetric expansion is measured the time for the complete process can be predetermined by multiplying the measured period of time by a given factor. For instance I have found that if the time required for a volumetric expansion of 25% above the original volume of the dough is measured, I can arrive approximately at the full time necessary for the process by multiplying the measured period of time by a factor of 3. This factor of 3 may, however, be slightly varied should the baker desire to produce bread, pastry or the like of a particular quality, appearance or taste. For example, if an unusually high fermented loaf of bread be required, the factor may be as high as $3\frac{1}{2}$, or, if there be required a loaf less fermented than is usually the case, or less fermented than a loaf produced from dough whose period of expansion has been determined by using the factor of 3, then a lower factor, say $2\frac{1}{2}$, may be adopted.

Dough at its final stage of rising is quite unstable, the height to which it rises and the extent of its inflation by gas being dependent on many varying influences. By determining the factor at a stage when the condition of the dough is stable reliability is attained. The dough is stable at a volumetric expansion of 25 per cent. The factor values are determined by "trial and error" once for all, for a particular type of bread, in the following way:

A batch of dough is baked, the time for a 25 per cent. expansion noted and the time for placing the dough in the oven being determined by judgment and experience. If the dough is rightly fermented to secure the quality of loaf desired, the total time from mixing the yeast with the flour and liquor to the time of setting the loaves in the oven divided by the time noted for the 25 per cent. expansion, gives the factor for future use. When once fixed, the factor need not be altered, as allowance for variations of yeast and temperature is provided for by the observation of the time of expansion of 25 per cent.

The factor I have found best is 3 and this applies equally to what are known as the long and short fermentation processes. But if under-fermentation be preferred, $2\frac{1}{2}$ may be sufficient. On the other hand, where a high stringy loaf is desired, flavor being ignored, a larger factor than 3 can be used. In any case, within limits of reasonable care and efficiency, the use of a stated factor will always indicate the time which gives a standard degree of fermentation, although the height of the resulting loaf may vary with the strength of the flour.

In the accompanying drawings an apparatus for carrying out the invention in practice is shown and whereby the early volumetric expansion of the dough can be measured and automatically signaled to the baker or other person.

Figure 1 is a front view of the apparatus.

Fig. 2 is a section on line X—X of Fig. 1 to an enlarged scale.

Fig. 3 is a section on line y—y of Fig. 2.

In a box or chamber A, which may be of cylindrical, square or other shape, is fitted an inverted bell or receiver B of say ⅘ the depth of the chamber A, adapted to be filled with the dough or the like, the expansion of which is to be measured. Small holes $b$ are formed around the upper part of the bell to allow air to escape when the dough is filled into it.

Hinged or otherwise suitably fitted to the top of the chamber A is a lid C provided with a bell D or other sounder or signal adapted to be operated automatically when the predetermined amount of expansion has taken place. In the arrangement shown the lid C is hinged to the chamber A by means of a hinge E, which when the lid is open may be disconnected so that the lid can be at once disconnected when desired to permit of the washing or cleansing of the chamber A and the bell B.

Pivoted on the lid C is a lever F urged by a spring G and carrying a bell hammer H. The under part of the lever F is provided with a lug J which projects downward through the lid C. When the lid C is free from the chamber A the lever F under the action of the spring G takes the position shown in dotted lines in Fig. 3, but when the lid C is home on the chamber or box A the lever F is pressed in so that the lug J fits inside the wall of the chamber A and bears against the wall thereof, the lever F and hammer H taking the positions shown in full lines in Fig. 3. It will be seen therefore that when the lid is opened the spring G will urge the lever to the dotted position and cause the hammer H to hit the bell D producing a sound.

In operation the time of mixing the dough is noted, the bell or receiver B is filled and inserted in the chamber A and as the dough ferments or expands the bell or receiver B rises in the chamber A till the top engages the lid C. As it further expands it raises the lid till the lug J of the lever F is released when the bell is sounded, notifying the baker of the fact that the dough has expanded the determined amount from which he can calculate the full time necessary for the process. To set the apparatus correctly an adjustable stop K may be provided in the lid C, against which the bell or receiver B may engage as it rises.

In operation the apparatus is placed in the vessel with the mass of the dough of which the apparatus contains a sample that it may be kept under the same temperature and other conditions.

Having thus described my invention and the best means I know of carrying the same into practical effect, I claim:—

1. A method for predetermining early in the process of producing fermentation or rising of dough for bread and the like the length of time required to complete the said process, which consists in ascertaining the number of minutes that expires between the time when the dough is formed by mixing yeast and other ingredients and the time when the dough while still stable has increased in volume by 25 per cent., and multiplying the said number of minutes by a factor that varies according to the type of bread required, the said factor being the quotient obtained once for all for that type of bread by dividing the time which by experiment is found necessary for dough to acquire the degree of fermentation essential for the said type of bread by the time required for the dough to increase in volume by 25 per cent.

2. A method for predetermining early in the process of fermentation or rising of dough for bread the length of time required to complete the said process, which consists in ascertaining the time required for a volumetric expansion of 25 per cent. of the dough, and multiplying such time by a factor of 3.

In testimony whereof I have signed my name to this specification in the presence of two subscribing witnesses.

ALFRED WATKINS.

Witnesses:
JAMES CULLUM NICHOLLS,
CHARLES STEPHENS SOUTHGATE.